(12) United States Patent
Riemers

(10) Patent No.: US 12,110,862 B2
(45) Date of Patent: Oct. 8, 2024

(54) OFF SHORE WIND ENERGY INSTALLATION FOUNDATION SYSTEM

(71) Applicant: Mark Riemers, Woerden (NL)

(72) Inventor: Mark Riemers, Woerden (NL)

(73) Assignee: SPT EQUIPMENT B.V., Woerden (NL)

( * ) Notice: Subject to any disclaimer, the term of this patent is extended or adjusted under 35 U.S.C. 154(b) by 315 days.

(21) Appl. No.: 16/754,238

(22) PCT Filed: Oct. 10, 2018

(86) PCT No.: PCT/NL2018/050666
§ 371 (c)(1),
(2) Date: Apr. 7, 2020

(87) PCT Pub. No.: WO2019/074363
PCT Pub. Date: Apr. 18, 2019

(65) Prior Publication Data
US 2020/0277936 A1    Sep. 3, 2020

(30) Foreign Application Priority Data
Oct. 10, 2017   (NL) .................................... 2019701

(51) Int. Cl.
*E02D 27/42*         (2006.01)
*E02B 17/02*         (2006.01)
(Continued)

(52) U.S. Cl.
CPC ............ *F03D 13/25* (2016.05); *E02B 17/027* (2013.01); *E02D 27/425* (2013.01);
(Continued)

(58) Field of Classification Search
CPC ....... F03D 13/25; F03D 13/22; E02D 27/425; E02D 27/525; E02D 2250/0053;
(Continued)

(56) References Cited

U.S. PATENT DOCUMENTS 4,000,624 A * 1/1977 Chow .................... E02B 17/025
                                                            405/208
4,318,641 A * 3/1982 Hogervorst ............. B63B 21/27
                                                            405/172
(Continued)

FOREIGN PATENT DOCUMENTS

| CN | 101666101 A | 3/2010 |
|---|---|---|
| CN | 101761090 A | 6/2010 |

(Continued)

OTHER PUBLICATIONS

International Search Report and Written Opinion, dated Mar. 6, 2019, from corresponding PCT application No. PCT/NL2018/050666.

*Primary Examiner* — Benjamin F Fiorello
(74) *Attorney, Agent, or Firm* — NIXON & VANDERHYE

(57) ABSTRACT

The invention relates to a marine structure comprising a foundation system with three or more suction buckets. The suction buckets are designed to be installed in the seafloor to operate as a foundation or part of it to support an offshore structure resting onto the seafloor. The suction buckets support a connector body and the connector body is designed to support a payload. The invention also relates to a method of installing a suction bucket. During the method, the suction bucket bottom penetrates the seafloor and fluid is removed from the suction space such that penetration proceeds by suction.

21 Claims, 8 Drawing Sheets

(51) Int. Cl.
*E02D 27/52* (2006.01)
*F03D 13/20* (2016.01)
*F03D 13/25* (2016.01)
*E02B 17/00* (2006.01)

(52) U.S. Cl.
CPC ............ *E02D 27/525* (2013.01); *F03D 13/22* (2016.05); *E02B 2017/0039* (2013.01); *E02B 2017/0078* (2013.01); *E02B 2017/0091* (2013.01); *E02D 2200/1685* (2013.01); *E02D 2250/0053* (2013.01); *E02D 2300/0029* (2013.01); *E02D 2600/20* (2013.01)

(58) Field of Classification Search
CPC ......... E02D 2600/20; E02B 2017/0039; E02B 2017/0078; E02B 2017/0091
See application file for complete search history.

(56) References Cited

U.S. PATENT DOCUMENTS

| | | | | |
|---|---|---|---|---|
| 4,687,380 | A * | 8/1987 | Meek | E02B 17/027 |
| | | | | 405/203 |
| 5,567,086 | A | 10/1996 | Huete | |
| 6,481,932 | B1 * | 11/2002 | Riemers | E02B 17/021 |
| | | | | 405/196 |
| 6,488,446 | B1 * | 12/2002 | Riemers | E02D 27/52 |
| | | | | 405/203 |
| 2007/0243063 | A1 * | 10/2007 | Schellstede | E02D 27/42 |
| | | | | 416/10 |
| 2010/0219645 | A1 * | 9/2010 | Yamamoto | B63B 35/44 |
| | | | | 416/85 |
| 2012/0282037 | A1 * | 11/2012 | Luppi | E02D 27/42 |
| | | | | 405/227 |
| 2013/0227898 | A1 * | 9/2013 | Fairbairn | E02D 27/42 |
| | | | | 52/169.9 |
| 2015/0147174 | A1 * | 5/2015 | Couchman | B63B 1/107 |
| | | | | 416/37 |
| 2016/0002874 | A1 * | 1/2016 | Schultes | E02D 5/54 |
| | | | | 405/233 |
| 2016/0075413 | A1 * | 3/2016 | Nebrera Garcia | E02D 27/42 |
| | | | | 114/122 |
| 2017/0030045 | A1 * | 2/2017 | Krause | E04H 12/2269 |
| 2017/0152672 | A1 * | 6/2017 | Santucci | F03D 13/20 |
| 2018/0030963 | A1 * | 2/2018 | Viselli | B63B 1/107 |
| 2018/0195250 | A1 * | 7/2018 | Nelson | E02D 27/52 |

FOREIGN PATENT DOCUMENTS

| | | |
|---|---|---|
| CN | 202295230 U | 7/2012 |
| CN | 106939613 A | 7/2017 |
| DE | 102012021001 A1 | 10/2013 |
| EP | 0011894 B1 | 7/1984 |
| EP | 1074663 A1 | 2/2001 |
| EP | 1101872 A2 | 5/2001 |
| EP | 2910686 A2 | 8/2015 |
| EP | 1805414 B1 | 12/2015 |
| EP | 2955277 A1 | 12/2015 |
| EP | 2558648 B1 | 11/2017 |
| GB | 2300661 B | 7/1997 |
| JP | 2013-053425 A | 3/2013 |
| WO | 99/51821 A1 | 10/1999 |
| WO | 02/088475 A1 | 11/2002 |
| WO | 2006/024244 A1 | 3/2006 |
| WO | 2010/059489 A1 | 5/2010 |
| WO | 2012/103867 A1 | 8/2012 |
| WO | 2013/152757 A1 | 10/2013 |

* cited by examiner

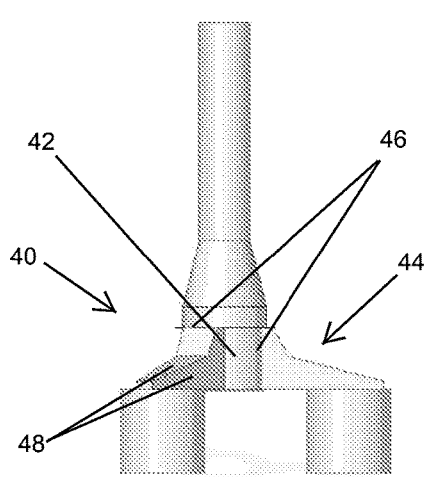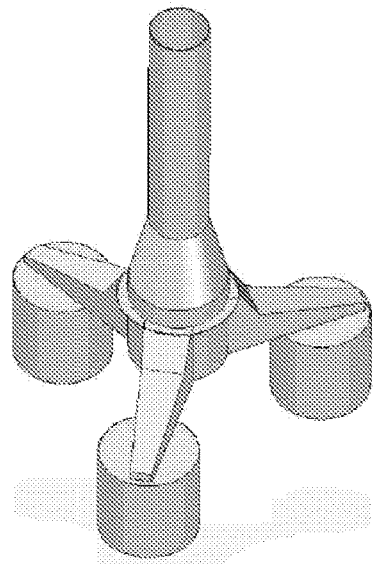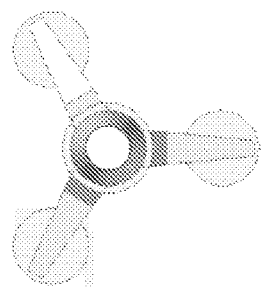
Fig. 1A  Fig. 1B  Fig. 1C
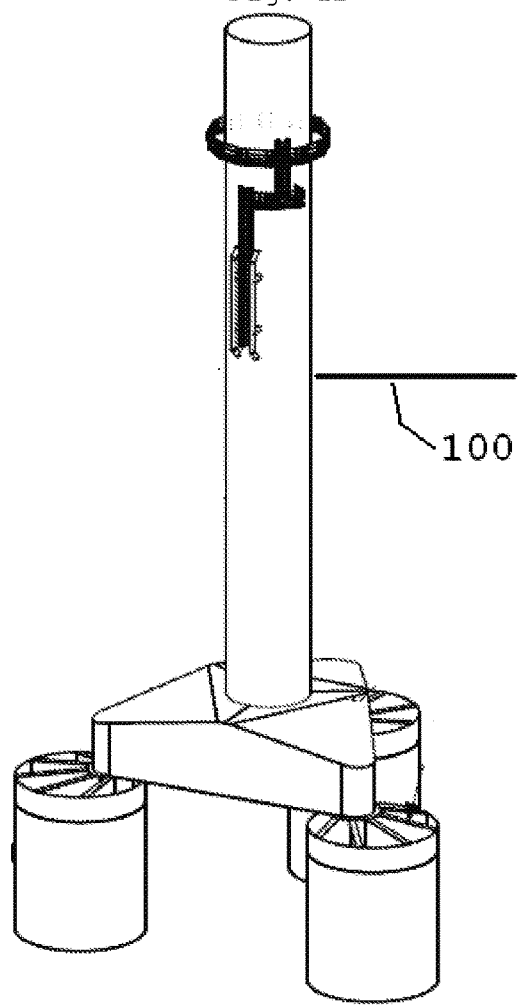
Fig. 2

OFF SHORE WIND ENERGY INSTALLATION FOUNDATION SYSTEM

BACKGROUND OF THE INVENTION

Field of the Invention

The invention relates to a foundation system for an offshore payload, preferably an offshore wind energy installation, however also applicable to oil or gas applications. The foundation system is provided with three or more suction buckets (hereafter also called "bucket"). The foundation system is in particular designed for the next generation off shore wind energy installations of 9 MW and higher. Particularly the foundation system is designed for supporting a single upright mast (also called pole or post) which supports the payload, preferably at its top end. In case of a wind energy installation the mast preferably comprises an upright monopole and on top of it an upright tower, wherein the tower supports the nacelle at its top. In stead of a nacelle the payload could comprise a platform, e.g. for oil or gas application. The mast, monopole and tower are preferably a single tube and/or made of steel however reinforced mineral cement concrete is also feasible. The payload preferably will be located high above the sea, e.g. at least 10 or 20 metre. Sea depth typically will be at least 10 or 20 or 50 metre.

Description of the Related Art

Suction buckets and how to install them are a.o. known from GB-B-2300661 and EP-B-0011894, which are enclosed in here by reference. Briefly, a suction bucket is a thin walled steel sleeve or pipe or cylinder, which cylinder is closed at its longitudinal top end by a bulkhead (also called top plate) or different sealing means and which cylinder is sealingly located on the subsea bottom with the open end opposite the bulkhead since this open end penetrates the subsea bottom due to the weight of the suction bucket. Thus the cavity, also called suction space, delimited by the cylinder and the bulkhead is sealed by the subsea floor such that vacuum or suction can be generated by removing water from within the suction space such that a resulting force tends to force the suction bucket deeper into the subsea floor. The creation of the suction can be with the aid of a suction source, such as a pump, being on, or close to or at a distance from the suction bucket and connected to the suction space. The applied level of the suction can be e.g. at least substantially constant, smoothly increase or decrease or else pulsate, for which there are convenient means. After use, the suction bucket can easily be removed by creating an overpressure within the suction space, e.g. by pumping in (sea) water.

A self installing marine structure, e.g. platform applying suction buckets is known from e.g. WO99/51821 (SIP1) or EP-A-1 101 872 (SIP2) of the present inventor. WO 02/088.475 (SIP3) discloses a tower carrying a wind turbine at the top and suction buckets as foundation.

Suction buckets are more and more applied as (part of) a foundation of an off shore wind energy turbine. For such application, typically three or more mutually spaced suction buckets are applied, providing a static balanced (in case of three suction buckets) or overbalanced (in case of more than three suction buckets) support. In operation, the suction buckets have at least almost completely penetrated the sea bed, are at equal or substantially equal level and have a mutual horizontal spacing providing a clearance of at least 5 metre, typically in the order of 20 metre, or a clearance of at least 0.5 or 1.0 times the diameter of the suction bucket (clearance means the shortest distance between the facing side walls). This assembly of suction buckets carries a single monopole or a space frame (also called jacket) of steel beams or tubes and on top of it a vertical tower supporting at its upper end the nacelle of the wind energy turbine provided with rotor blades, typically rotating around a horizontal axis and driven by the wind. The wind energy turbine converts wind energy into electrical energy. The wind turbine is typically part of a wind farm of identical wind turbines each provided with its own foundation of three or more suction buckets. A cable brings the electricity from the wind turbine generator to an electricity consumer on shore, e.g. a household.

One of the benefits of suction buckets is that a marine structure can be designed to be self bearing and/or self installing by providing it with one or more suction buckets. So the hoisting device and the plant for installing the foundation, e.g. hammering device, can be eliminated.

Since the structure is provided with one or more suction buckets, removal (also called decommissioning) after use is made easier in that by pressing out the suction bucket, the anchoring of the structure to the underwater bottom can be removed. The structure is typically at least substantially made from metal, typically steel.

Preferably each suction bucket has one or more of: a diameter of at least 5 metres, typically between 10 and 15 metre or even more; a height of at least 5 metres, typically between 10 and 15 metre or even more, subject to the soil conditions; a wall thickness of at least 1 centimetre, typically at least 3 or 5 centimetre; the longitudinal axis of the suction bucket and the relevant supporting leg (of the upper structure to be supported by the suction bucket) are substantially in line or eccentric.

OBJECT OF THE INVENTION

Particularly for wind energy turbines there are stringent requirements on many topics. Examples of these topics are: verticality of the tower for the complete service life (typically 20 years) of the structure; vibration frequency; low production costs; environmental friendly; efficient recovery of verticality to repair a failure.

For verticality, typically, a deviation of more than 1 degree from the vertical will result in a seizure of the wind turbine operation, which could lead to penalty claims. Such deviation can occur at any time during the lifetime of the structure, e.g. caused by settlement of the soil underneath or near the suction buckets, excessive forces from sea waves or the wind.

As an example for the vibration frequency topic, the design must be such that vibrations generated during operation may not lead to structural damage to the offshore structure. Natural frequencies play an important role in this respect. Resonance is preferably avoided.

The object of the invention is versatile and can be learned from the information disclosed in the application documents.

The present inventor has developed, in a preferred embodiment, a solution to this object embodied by a foundation system for an offshore wind energy installation, having one or more of the following: N, being at least three, suction buckets at the corners of an imaginary, preferably regular, polygon, seen in top view; a round or polygonal connector body, seen in top view, which preferably has at least N radially external corners and supports the payload, e.g. the tower of the wind energy installation, preferably at its centre, and which is, at each of N corners, connected to the top end of a relevant suction bucket by rigid connections, such that all N suction buckets are rigidly connected to the connector body; the connector body is provided completely below sea level and/or has a hollow monocoque structure or load bearing skin, possibly providing radial stays and/or being non rube like; the connector body being of closed profile for its complete extension, preferably without any slits and/or having an impermeable skin; the cross section of the connector radially towards the outside narrows in height (i.e. axial direction of suction bucket) and/or width (i.e. tangential direction); the vertical distance between a suction bucket or its top plate and the connector body is less than 5 or 2 or 1 metre, more preferably less than 25 centimetre. The invention is also defined in the claims.

Thus, the upper structure comprising the mast or monopole and/or tower is supported by the connector body and the connector body is supported by the suction buckets. In different words, the upper structure rests upon the connector body and the connector body rests upon the suction buckets.

Preferably one or more of the following applies to the connector body: comprises a centrally located tower or monopole receiving element; is designed to be or is filled with ballast material, preferably for at least 50% of its enclosed volume; is made of steel or reinforced mineral cement concrete; is thin walled; transfers all the loads (including vertical and horizontal loads, bending moments and torsion) from the monopole and/or tower to the suction buckets; is compact in height, e.g. to allow fabrication in a shop, which preferably does not exceed 1.5 times the outer diameter of the prismatic part of the monopole and/or tower; a width such that, seen in top view, the foundation system provides an envelope having a maximum span measuring at least 3 times the outer diameter of a suction bucket; overlaps, seen in top view, with the suction buckets and preferably does not radially extend beyond the suction buckets; extends substantially horizontal or at an angle of less than 10 or 20 degrees with the horizontal; substantially box shaped; made from flat sheets; one or more of side face, upper face and lower face are substantially flat and/or make corners where they mutually join and/or are locally provided with stiffeners, preferably inside; has an angular cross section, at least for its arms; is present above the top plate of the suction buckets; is free from the sea bed; keeps a gap with the sea bed of at least 25 or 50 centimetre; its arms have a height, preferably measured at their location of maximum height, at least 0.5 or 0.6 or 0.75 and/or less than 1.5 or 2 or 2.5 times the diameter of the monopole at the level of the connector body; its arms have a width, preferably measured at their location of maximum width, at least 0.25 or 0.5 and/or less than 1.0 or 1.5 or 2 times the height, preferably measured at their location of maximum height, of the arms; is substantially star or triangular or square shaped as seen in top view; has a wall thickness at least 2 or 5 or 10 millimetre and/or less than 200 or 100 or 50 millimetre; has a substantially flat lower side. The arm is the member extending from the central part towards a bucket.

The invention is based on the discovery, made by the inventor, that one or more or all the stringent requirements can be fully met by keeping the foundation system as deep as possible below the water level, preferably below 10 or 15 meters above the seabed. Thus the mast or monopole or tower must be as long as possible.

The invention is also based on the teaching, obtained by the inventor, that one or more of the following is possible: tilting correction; ease of transport over water to the final offshore destination; deeper penetration of the suction buckets into the sea bottom; locating ballast on top of the suction buckets; minimizing pumping effect caused by cyclic loading of bucket top plate by the payload.

For the mast/monopole/tower one or more of the following applies: the lower part connecting to the connector body has an enlarged diameter, e.g. diameter 10 or 12 metre compared to 6.5 metre at the prismatic part; diameter at water level at least 1 or 2 metre smaller than at the level of the connector body; wall thickness at least 20 or 35 millimetre and/or less than 200 millimetre, e.g about 50 millimetre; hollow; thin walled; cylindrical for substantially its complete height; above the level of the upper face of the suction bucket top plate or the under side of the connector body.

The prior art shows many proposals for a foundation system for a mast or monopole or tower. Examples are: WO2012103867A1 (Weserwind) discloses a below sea level extending tripod type foundation for off shore wind energy application using three into the sea bed rammed piles; EP2558648B1 (Siemens) discloses another tripod type for off shore wind energy application using three into the sea bed rammed piles; EP1805414B1 (Bard Engineering) discloses a from the sea bed to above sea level extending triple type for off shore wind energy application using three into the sea bed rammed piles, and also addresses the need for avoiding the natural frequency of the foundation being equal to the rotor frequency to avoid resonance; U.S. Pat. No. 5,567,086A discloses a below sea level extending tension leg type system for off shore oil drilling; EP1074663A1 discloses an into the ground embedded star type foundation system for wind energy application using ground anchoring rods.

The in this application cited documents are inserted in here by reference and each provide technical background for a better understanding of this invention.

After installation into the sea bed is completed, a gap (also called "void") can remain between the top of a soil plug inside the suction space and the closed suction bucket top. For wind turbine applications, such gap needs be filled with filler material or a filler body to prevent settlement of the suction bucket and to transfer the loads, e.g. downward or shear, from the wind turbine and structure in to the seabed. It is feasible that this filler material cures or hardens or becomes rigid after it has entered the gap. This filler material provides a body (hereafter also called "slab") inside the suction space. Obviously, this slab is typically provided after the suction bucket is sunk to the water bottom and penetrated the water soil to its final depth, by pouring or casting the at that time flowable material of the slab into the sea water filled space between the top bulkhead and the top face of the soil plug within the suction bucket.

This slab typically has a height of at least 10 or 20 or 30 centimetres and/or less than 50 or 100 or 150 centimetres.

It is noted that the invention is preferably directed to suction buckets for foundations, in other words designed to carry the weight of an upper structure, e.g. wind turbine or platform, placed on top, to avoid that such upper structure sinks into the subsea bottom. Thus a foundation suction bucket bears loads from the associated upper structure which tend to force the suction bucket further into the ground. The slab below the top bulkhead is designed to prevent that the suction bucket moves deeper into the subsea bottom due to the pushing loads generated by the weight of the upper structure. A foundation suction bucket is by the nature of its loading different from a suction bucket for anchoring, which anchoring suction bucket must withstand pulling forces from the anchored object which tries to leave its desires location by trying to pull the anchoring suction bucket out of the subsea bottom.

Preferably one or more of the following applies: the suction required to penetrate the suction bucket into the subsea bottom during installation and/or the overpressure applied during settlement correction or to extract the suction bucket from the sea bed is generated within the suction bucket above the slab or above the top bulkhead of the suction bucket, preferably since the suction side of a suction pump means or the pressure side of a pressure pump means is connected to the suction bucket at a location above the slab, e.g. the top bulkhead is provided with a nozzle or different sealable port for fluid connection of the suction space with a suction or pressure pump means; the diameter of the suction bucket is constant over its height (the height is the direction from the top bulkhead towards the opposite open end); from the top bulkhead the cylinder walls of the suction bucket extend parallel; the open end of the suction bucket, designed to be located on the sea floor first is completely open, in other words, its aperture is merely bordered by the cylinder walls; the water depth is such that the suction bucket is completely below the water surface when its lower end contacts the sea floor, in other words when its lower end has not penetrated the sea floor yet; the foundation comprises three, four or more mutually spaced suction buckets; the slab completely fills the gap; with the penetration of the suction bucket into the sea floor completed, the top bulkhead is spaced from the sea floor and/or the lower side of the slab bears onto the sea floor which is possibly at elevated level within the suction bucket, compared to the seafloor level external from the suction bucket, due to raising of the seabed plug within the suction space caused by penetration of the suction bucket into the seabed; the by releasable sealing means, e.g. a valve, selectively closable port in the top bulkhead to allow water entering and/or exiting the suction bucket is provided with a coupling means designed for temporary engagement of a suction and/or pressure pump at the time of installing, settlement correction and removing, respectively, of the suction bucket into and from, respectively, the seafloor soil, which port is associated with the fluid flow channel.

Preferably, the design of the suction bucket is such that fluid from a source, e.g. pressure pump, flows from the source through a sealed channel, terminating below the bulkhead and within the suction space. During sucking in the pressure is typically at least 0.1 or 0.25 or 0.5 or 1 bars below the local water pressure external from the suction bucket. During pressing out (correction operation or decommissioning) the pressure is typically at least 0.25 or 0.5 or 1 or 2 bars above the local water pressure external from the suction bucket.

The suction bucket is also preferably provided with known as such valves and/or hatches adjacent or at its top bulkhead for selectively allowing water and air to enter or exit the suction space through the top side of the suction bucket.

Preferably the invention is directed to an offshore foundation system or a suction bucket of said system, the suction bucket preferably provided by an open bottom and closed top, advantageously cylindrical, elongate shell providing a suction compartment or suction space, said closed top having an externally facing upper face and an opposite, toward the suction space facing lower face and preferably provided with one or more valves selectively allowing fluid communication between the suction space and the environment, the suction space being provided with a fixedly located slab and wherein, in use, the slab bottom bears onto atop of a soil plug inside the suction space, the top bulkhead of the suction bucket bears onto the slab.

A possible procedure is as follows: the foundation system provided with at least three suction buckets is installed and when the buckets have arrived at their final penetration depth into the sea bed, e.g. of sand or clay, the slab, if applied, is provided by introducing the flowable filler material such that the gap is completely or substantially filled. Subsequently the upper structure to be supported by the foundation system is installed. First, the monopole is located on top of the foundation system, followed by installing the tower on top of the monopole. The tower carries the wind energy turbine nacelle at its top end. The tower is completely or partly above water level.

The ballast material applied preferably has a specific weight of at least 1,400 (e.g. sand) or 2,000 (e.g. rock) kg per cubic metre, thus at least 1.4 times or twice the specific gravity of water. In an embodiment the ballast is concentrated near the suction buckets, e.g. located on top of the suction buckets. The ballast can have a thickness of at least 1 or 1.5 or 2 metres. Application of ballast to the connector body and/or the suction buckets is also feasible.

The connection between connector body and monopole can be provided by grouting or welding or mechanical fastening means, e.g. riveting or bolting. Use of a quick coupling is preferred, e.g. of so called slip joint type, such as disclosed in EP 2 910 686 (KCI the engineers, disclosed in here by reference) and to which claim 14 is directed.

A quick coupling of slip joint type is preferably provided (see also FIG. 15) by wedging walls inclined at a sharp angle relative to the axial direction of the tower and located at the tower and/or connector body at locations where the tower penetrates into the connector body, or vice versa, and oriented such that said wedging walls extend outward from the tower, as viewed in upward direction of the tower in its final vertical attitude as installed, such that the wedging walls provide a conical shaped circumferential or peripheral, e.g. ring like, means, a first one at the tower, a second one at the connector body and configured such that if the tower and connector body are mutually penetrated or inserted, the wedging walls of the first and second one mutually engage and contact, retaining the tower against further lowering by gravity action and also generating radially inward directed clamping forces between these wedging walls, keeping the tower clamped to the connector body. The first one and the second one make a pair and preferably there are two pairs, mutually spaced axially of the tower, at least 0.5 meter.

The words "mast", "monopole" and "tower" have individual meaning, however also identical meaning, e.g. more general, such as: each being an elongated tube or pole like object. Thus, if any of these three words is used in this disclosure, it can also have a meaning identical to any of the two other of these three words and/or the more general meaning.

BRIEF DESCRIPTION OF THE DRAWINGS

The invention is further illustrated by way of non-limiting, presently preferred embodiments providing the best way of carrying out the invention and shown in the drawings.

FIG. 1A-C show a first embodiment from three different angles;

FIG. 2-4 show a perspective view of a second, third and fourth embodiment, respectively;

DETAILED DESCRIPTION OF THE PREFERRED EMBODIMENTS

Figure 3:
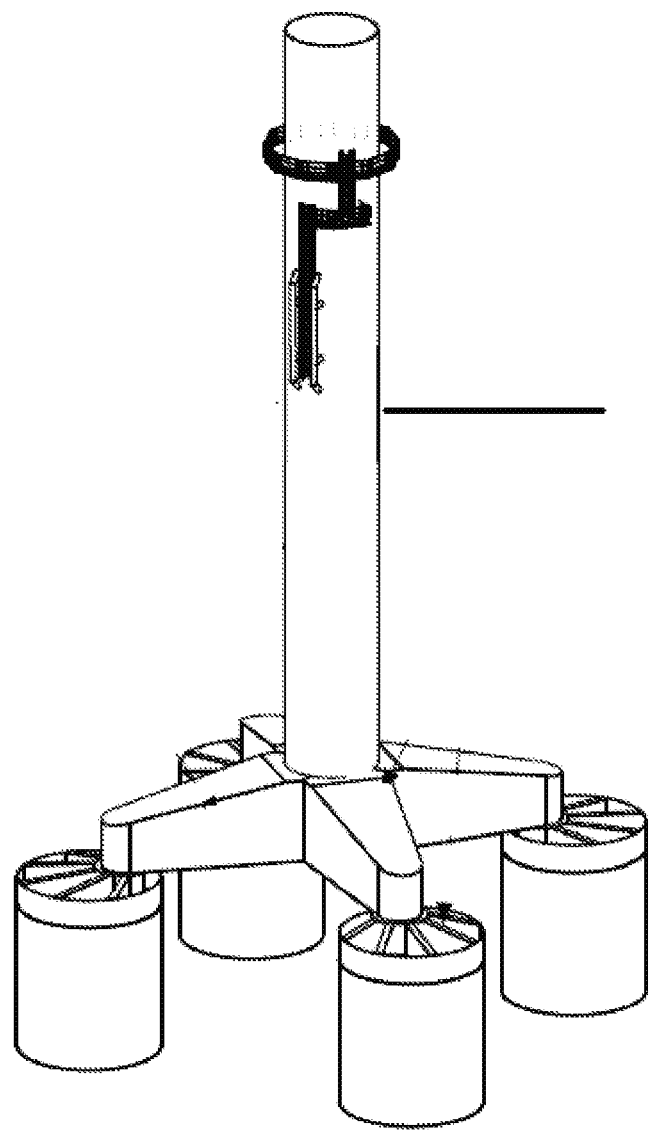

FIG. 1 shows three suction buckets, on top of it a star shaped connector body 40 having a central portion 42 and three arms 44 each connected to the central portion 42 at straight seams 46, each radially outward extending, and there above a single upright tube providing a mast and/or tower and/or monopole. The arms 44 formed of a plurality of attached plates 48. The lower part of the mast has a conical shape.

Figure 4:
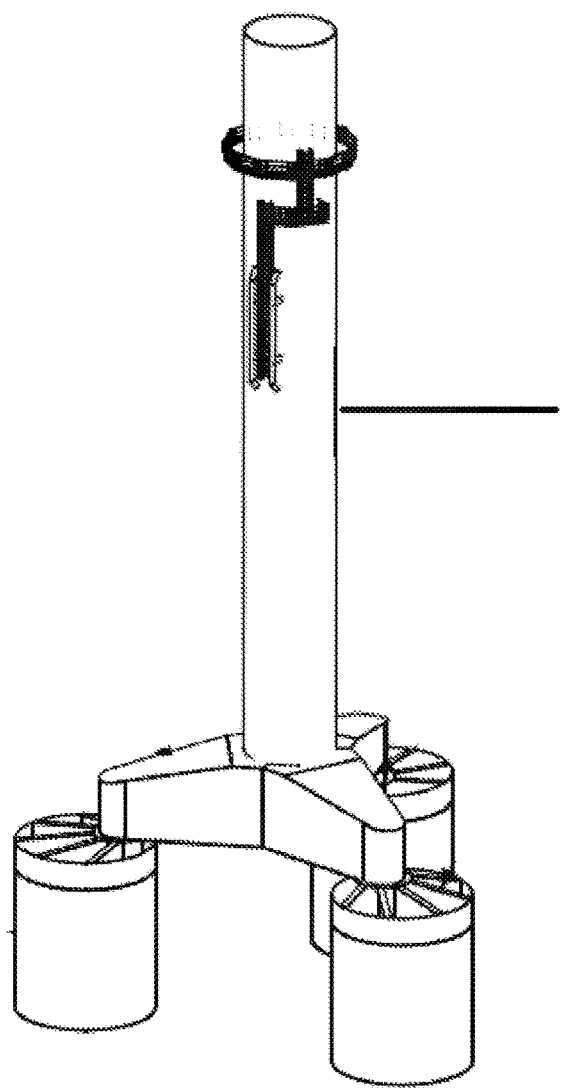

FIG. 2 shows three suction buckets, there above a triangular shaped connector body and there above a prismatic mast. The water level 100 is also illustrated. FIG. 3 shows four suction buckets, a star shaped connector body having tour arms and above it a prismatic mast. FIG. 4 shows a scar shaped connector body having three arms and a prismatic mast.

Figures 5A, 5B, 5C:
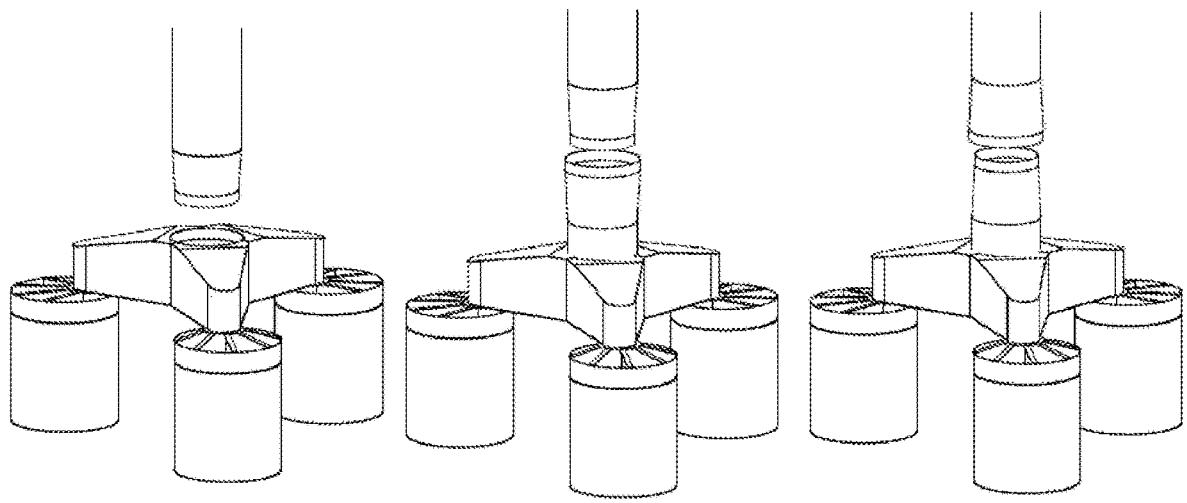
FIG. 5A-C show a perspective view, of exploded type, of three alternative ways of mounting the monopole to the foundation system.

In FIG. 5A the lower end of the mast penetrates the connector body. In FIG. 5B the lower end of the mast penetrates a from the connector body upwards projecting transition piece. In FIG. 5C the transition piece penetrates the lower end of the mast. In all three cases the slip joint can be applied.

Figure 6:
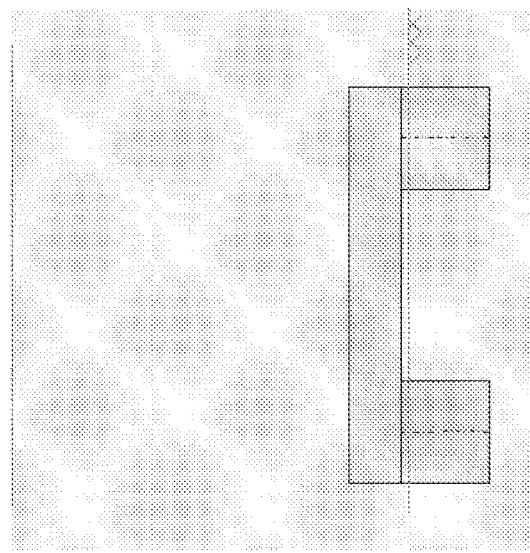

According to FIG. 6, the suction buckets and connector body provide a sub assembly separate from the mast or tower or monopole. This subassembly was sailed to its final offshore location and there the suction buckets were penetrated into the sea bed. After that part of the mast was added (FIG. 7) and after that a further part of the mast was added (FIG. 8).

Figure 8:
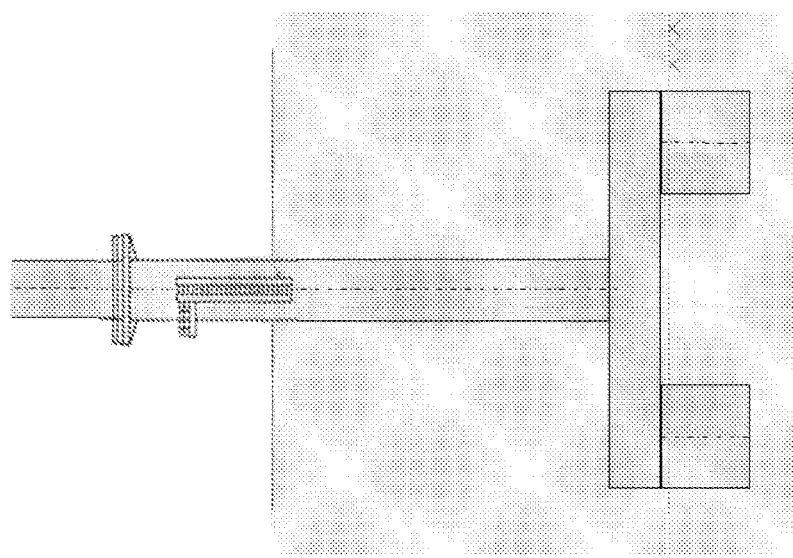
FIG. 6-8 show in side view the three main phases during a possible manner of installing the off shore wind energy installation.
Figure 7:
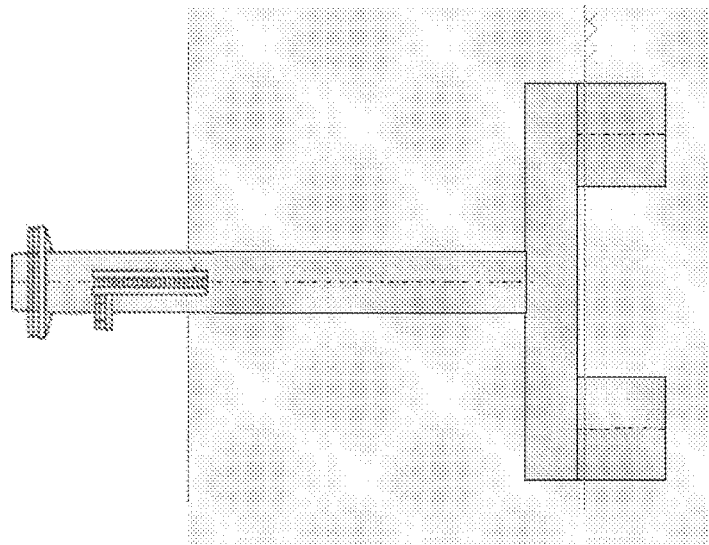

Different from FIG. 6-8, an alternative manner of installation is to sail the subassembly shown in FIG. 7 (buckets, connector body and monopole mutually assembled at a remote location) to the final offshore location and install it there, after which the payload is added.

Figure 9:
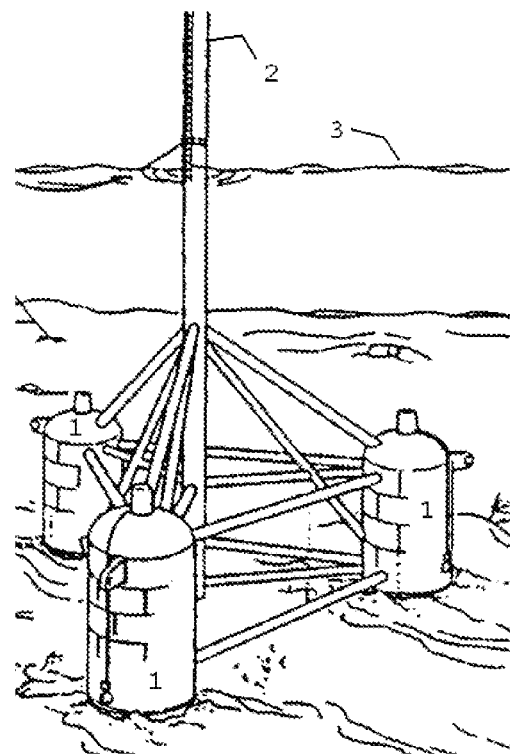
FIG. 9-14 show prior art foundation systems.
Figure 10:
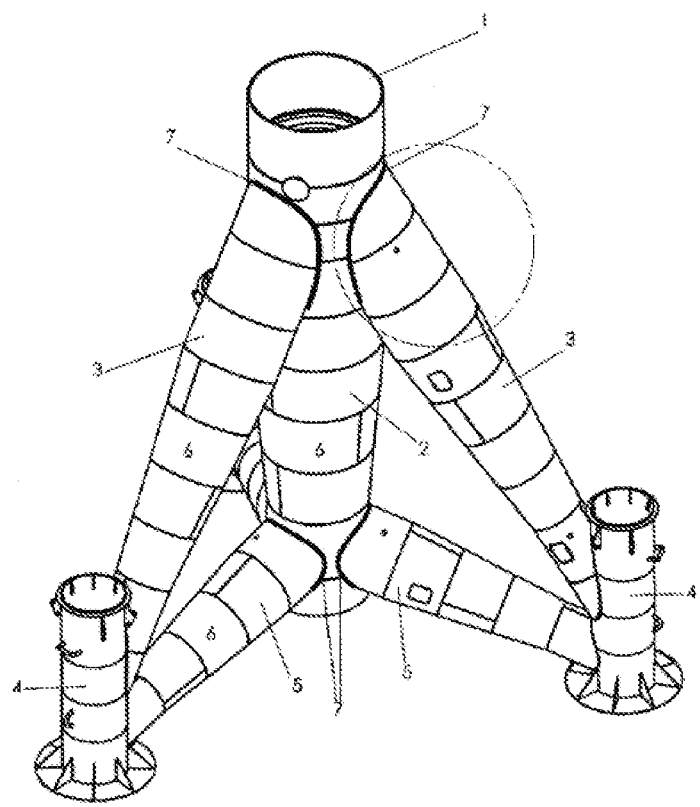
Figure 11:
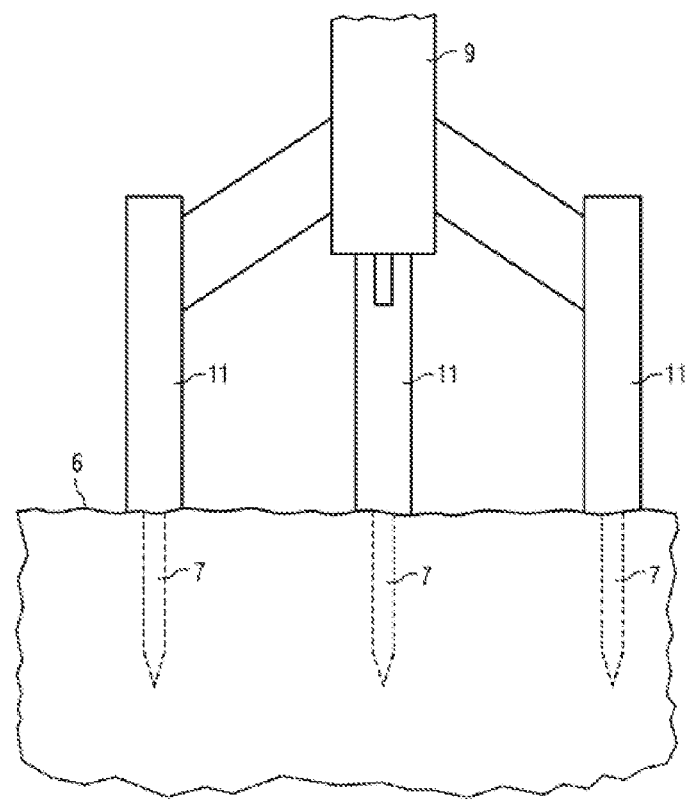
Figure 12:
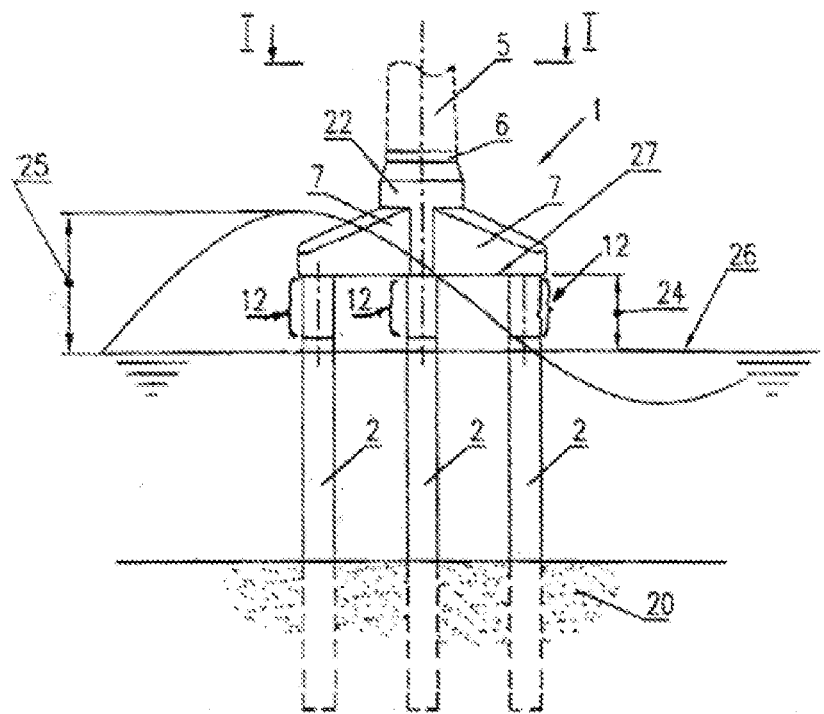
Figure 13A:
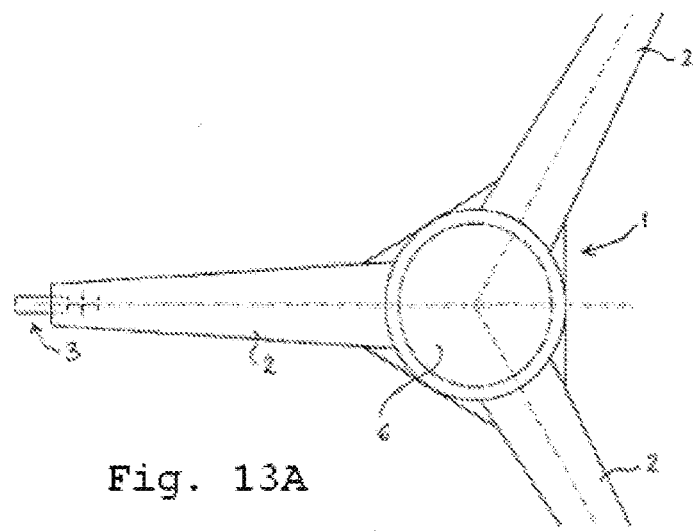
Figure 13B:
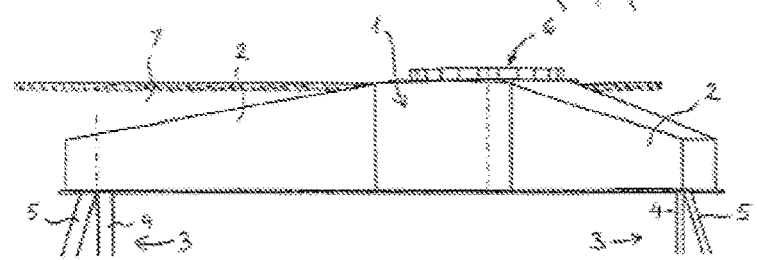
Figure 14:
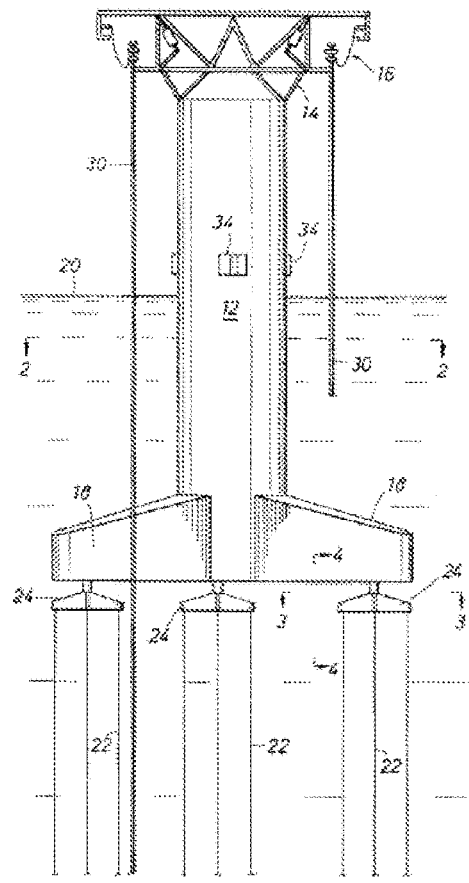

FIG. 9 shows a jacket type, FIG. 10 a tripod type, FIG. 11 a tripod type, FIG. 12 a tri pile type, FIG. 13 a buried type and FIG. 14 a tension leg type offshore structure.

Typically, there are three stages during penetration of the suction bucket into the sea floor by suction within the suction space. In the initial stage the open bottom of the suction bucket has penetrated the seabed by gravity, such that the suction space is sealed. The second stage is obtained by removing water from the suction space by pumping, such that suction is created within the suction space such that the suction bucket penetrates deeper into the seabed, thus its top comes closer to the seabed. In the third stage the suction bucket is penetrated to its final depth, providing its design load bearing capacity for a weight resting on top of it. Typically, the top bulkhead is spaced from the sea floor. Within the suction space internal from the side wall of the bucket, the surface of the sea floor material rises due to penetration of the suction bucket. Such seabed part captive within the suction space is also called soil plug. Typically the void between the bulkhead and the soil plug is filled by a slab or body. The suction space is bounded by the top bulkhead, the cylindrical side wall and the open end opposite the top bulkhead.

Figure 15:
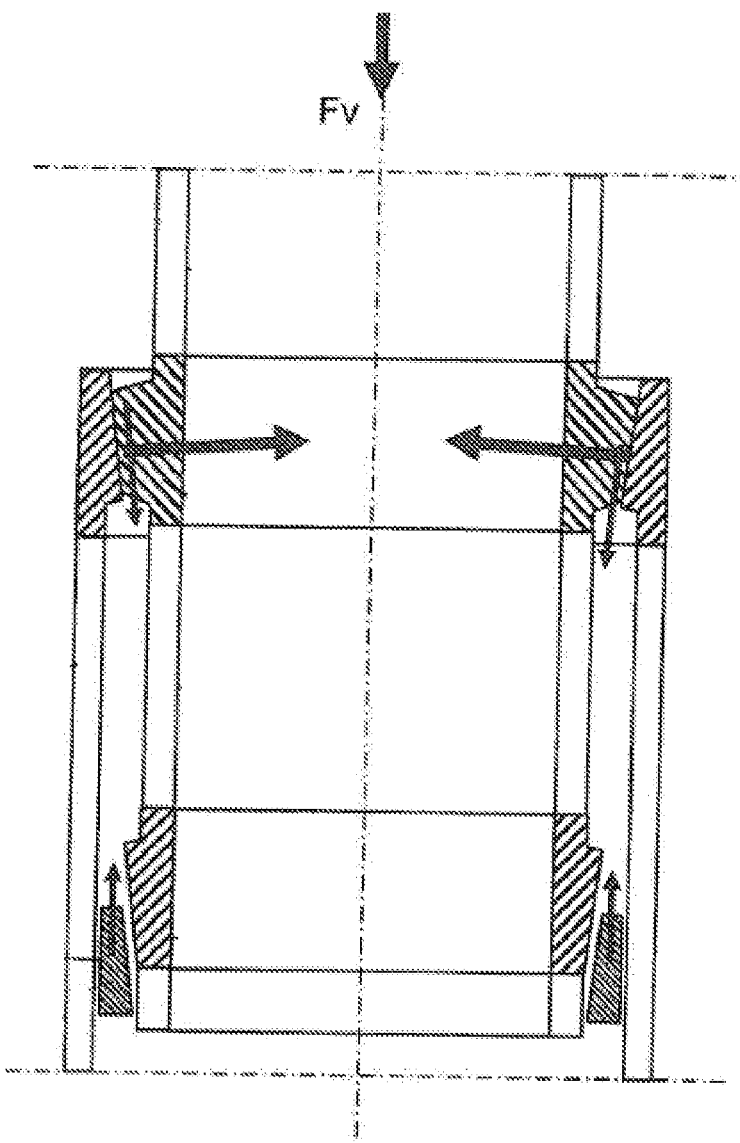
FIG. 15 shows a double slip joint in section from the side.

FIG. 15 shows an inner tube, e.g. the monopole, and an outer tube, e.g. the wall of the central hole of the connector body to receive the monopole. Each tube is provided with two axially spaced conical rings, providing two pairs of each an inner ring of the inner tube and an outer ring of the outer tube. Due to the downward directed force Fv, oriented according to the gravity force, the radially inward directed clamping forces are generated (only shown for the upper pair).

The invention is not limited to the above described and in the drawings illustrated embodiments. E.g. the marine structure can have a different number of suction buckets. The drawing, the specification and claims contain many features in combination. The skilled person will consider these also individually and combine them to further embodiments. Features of different in here disclosed embodiments can in different manners be combined and different aspects of some features are regarded mutually exchangeable. All described or in the drawing disclosed features provide as such or in arbitrary combination the subject matter of the invention, also independent from their arrangement in the claims or their referral.

The invention claimed is:

1. An offshore structure made of steel, the offshore structure comprising:
   a foundation system including three or more suction buckets configured to be installed in the seabed, the three or more suction buckets being disposed at corners of an imaginary polygon, viewed in top view, to act as the foundation system or a part of the foundation system to carry an upper offshore structure supported on the seabed, the three or more suction buckets carrying a steel connector body configured to carry a payload, the steel connector body having a plurality of steel arms, all of the plurality of steel arms of the steel connector body extending from a central part of the steel connector body radially outwardly in a horizontal direction or at an angle of less than 20 degrees relative to the horizontal direction to each of the respective suction buckets, the steel arms being attached to the suction buckets at ends of the respective steel arms, the steel arms of the steel connector body having a height measured at a location of maximum height, between 0.75 and 1.5 times the diameter of one or more of a mast, a tower, and a monopole at a level of the steel connector body and having a width measured at a location of maximum width between 0.5 and 1.0 times the height measured at the location of maximum height,
   wherein the cross-section of the steel arms of the steel connector body is box-shaped with an angular cross-section, and
   wherein the steel arms of the steel connector body are flat plates, four flat sides of the steel arms including a top side, a bottom side, a left side, and a right side, of each of the arms connecting to each other via angular corners, the arms being respectively connected to the central part of the steel connector body at straight seams.

2. The offshore structure according to claim 1, wherein the offshore structure is configured as an offshore wind energy installation of at least 9 MW extending upwards from the seabed at an offshore location where the seabed is at least 10 meters below the local water level, the offshore wind energy installation configured to be connected with an electricity cable run on land to carry the offshore-generated electricity.

3. The offshore structure according to claim 1, wherein the steel connector body has a star shape, seen in top view, the steel connector body having the same number of external corners as the number of the three or more suction buckets, the external corners being formed by the radial outwardly-extending arms which provide the star shape, and the offshore structure further comprises a single vertical tower disposed, centrally, between the three or more suction buckets, seen in top view, formed by a single tube and made of steel, the single tube carrying a gondola of a windmill at a top thereof, the gondola having rotor blades at least 20 meters above the local water level.

4. The offshore structure according to claim 3, wherein the single vertical tower rests on top of the foundation system and the steel connector body rests on top of all of the three or more suction buckets, the tower is disposed completely above an underside of the steel connector body, the tower being hollow and having a wall thickness between 20 and 200 millimeters, the tower being, above the water level, prismatic over its entire length and being rigidly mounted to the steel connector body.

5. The offshore according to claim 3, wherein the tower, the steel connector body, and the suction buckets are rigidly mounted so that all vertical and horizontal loads, bending moments, and torsion are transmitted from the tower to the suction buckets via the steel connector body, wherein the tower is attached to the steel connector body by a beam, a single longitudinal end of the beam being fixedly wedged so that the tower extends vertically upwards from the steel connector body as a cantilever beam, the tower being above the steel connector body free from structures that transfer mechanical loads from the tower onto the seabed.

6. The offshore structure according to claim 3, wherein the foundation system extends a maximum of 15 meters above the local seabed and is disposed completely below the highest point of the steel connector body, the offshore structure further comprises extend structures attached to the tower only in an area downwards from the highest point of the steel connector body, the extend structures configured to transfer all loads from the tower to the seabed.

7. The offshore structure according to claim 3, wherein the steel connector body and the tower include one or more couplings configured to keep the tower and the steel connector body together in a load-bearing manner, the couplings allowing uncoupling without causing permanent damage to parts involved in coupling the steel connector body and the tower.

8. The offshore structure according to claim 7, wherein the complete force flow from the steel connector body to the tower, and from the tower to the steel connector body, flows for a minimum of 95% via the couplings.

9. The offshore structure according to claim 7, wherein the one or more couplings clamp the tower in the steel connector body, or clamp the steel connector body in the tower, by a wedging action and are driven by the gravity force acting on the tower, so that by moving a longitudinal end of the tower clamped in the steel connector body due to wobbling of the tower, the tower is increasingly tightly clamped to the steel connector body.

10. The offshore structure according to claim 7, wherein the one or more quick couplings include one or two first wedge devices that are conical rings, provided to the tower, the first wedge devices being conically-shaped or wedge-shaped at one side, and one or two second wedge devices that are conical rings, provided to the steel connector body, the second wedge devices being wedge-shaped or conically-shaped at one side, such that one or two pairs of each of the first and second wedge devices such that when the coupling is engaged, by inserting the tower into the steel connector body or inserting the steel connector body into the tower, the first and second wedge devices are coaxial and parallel and the wedge or conical sides of the first and second wedge devices of at least one pair of the first and second wedge devices face and contact each other, the first wedge device contacting at the inner side or within the second wedge device, or the second wedge device contacting at the inner side or within the first wedge device, when the at least one pair includes two pairs of the first and second wedge devices, the distance between the two first wedge devices equals the distance between the two second wedge devices, viewed in the longitudinal direction of the tower, the at least one pair providing a slip joint.

11. The offshore structure according to claim 1, wherein each of the suction buckets is a vertical steel cylinder having a wall thickness of at least 3 millimeters and a diameter between 10 and 15 meters, each of the vertical steel cylinders being closed in an airtight manner at a top end by a top plate, each of the vertical steel cylinders being open and extending into the seabed at a lower end thereof that is in fluid communication with a suction space inside the respective suction bucket, the vertical steel cylinders, each of the suction buckets being configured to be installed in the seabed by hydraulic underpressure generated in the suction space inside the cylinder, the hydraulic underpressure being generated by an external suction pump connected to a top plate provided with a suction port with a suction valve in fluid communication with the suction space, the suction buckets being configured to penetrate into the seabed, the suction buckets having a mutual spacing of at least 5 meters and providing a statically balanced or overbalanced support for the connector body, each of the suction buckets containing a molded filling body inside with which a gap between the top of the seabed inside the suction bucket the top plate is completely filled up after completion of sucking, the filling body having a height between 10 and 100 centimeters and configured to prevent the respective suction bucket from being pushed deeper into the seabed by the upper offshore structure resting on top of the respective suction bucket.

12. The offshore structure as claimed in claim 1, wherein the steel arms of the steel connector body have a flat underside, and the steel connector body y is a completely closed body, is completely hollow, and has a closed, monocoque construction having external walls that carry the loads.

13. The offshore structure as claimed in claim 1, wherein each of the three or more suction buckets has a substantially horizontal top plate and the steel connector body rests on each of the horizontal top plates.

14. The offshore structure as claimed in claim 13, wherein each of the arms of the steel connector body extends over the top plate of the associated suction bucket from the bucket wall towards the center of the top plate.

15. The offshore structure as claimed in claim 1, wherein the steel connector body is attached to the top plate of the respective suction bucket by a rigid connection.

16. The offshore structure as claimed in claim 1, wherein the steel connector body is box-shaped with an angular cross-section.

17. The offshore structure as claimed in claim 1, wherein the steel connector body is configured to be or is filled with ballast material, for at least 50% of its enclosed volume.

18. A method of installing the offshore structure according to claim 1, the method comprising:
providing a first sub-unit comprising the three or more suction buckets and the steel connector body and a second sub-unit comprising the tower, the first and second sub-units being separate from each other, at least 10 meters apart, floating in the water transported by sailing over a distance of at least 100 or 1000 meters to the offshore installation location, the first sub-unit being in an upright position; and
combining the first and second sub-units that are floating in the water into the offshore structure.

19. The method according to claim 18, wherein, during float transport in the water to the offshore installation location, the first and the second sub-units sail underneath one or more fixed bridges for car traffic crossing the water, without obstructing the car traffic across the bridge.

20. The method according to claim 18, wherein the first sub-unit and the second sub-unit are combined by activating couplings at the steel connector body and the tower.

21. An offshore structure comprising:
a foundation system including three or more suction buckets configured to be installed in the seabed, the three or more suction buckets being disposed at corners of an imaginary polygon, viewed in top view, to act as the foundation system or a part of the foundation system to carry an upper offshore structure supported on the seabed, the three or more suction buckets carrying a connector body configured to carry a payload; and
a single vertical tower disposed centrally between the three or more suction buckets, seen in top view, formed by a single tube and made of steel, the single tube carrying a gondola of a windmill at a top thereof, the gondola having rotor blades at least 20 meters above the local water level, the single vertical tower resting on top of the foundation system and the connector body resting on top of all of the three or more suction buckets, the tower being disposed completely above an underside of the connector body, the tower being hollow and having a wall thickness between 20 and 200 millimeters, the tower being above the water level, prismatic over its entire length and being rigidly mounted to the connector body,
wherein the offshore structure is made of steel and configured as an offshore wind energy installation of at least 9 MW extending upwards from the seabed at an offshore location where the seabed is at least 10 meters below the local water level, the offshore wind energy installation configured to be connected with an electricity cable run on land to carry the offshore-generated electricity,
the connector body has a star shape, seen in top view, the connecting body having the same number of external corners as the number of the three or more suction buckets, the connector body having a plurality of arms extending from a central part of the connector body radially outwardly to each of the respective suction buckets, all of the plurality of arms of the connector body extending from the central part of the connector body radially outwardly in a horizontal direction or at an angle of less than 20 degrees relative to the horizontal direction to each of the respective suction buckets, the external corners being formed by the radial outwardly-extending arms which provide the star shape, each of the suction buckets is a vertical steel cylinder having a wall thickness of at least 3 millimeters and a diameter between 10 and 15 meters, each of the vertical steel cylinders being closed in an airtight manner at a top end by a top plate, each of the vertical steel cylinders being open and extending into the seabed at a lower end thereof that is in fluid communication with a suction space inside the respective suction bucket, the vertical steel cylinders being in the seabed by hydraulic underpressure generated in the suction space inside the respective cylinder, the hydraulic underpressure being generated by an external suction pump connected at the top plate provided with a suction port with a suction valve in fluid communication with the suction space, the vertical steel cylinders being penetrated into the seabed, the three or more suction buckets having a mutual spacing of at least 5 meters and providing a statically balanced or overbalanced support for the connector body,
the respective suction buckets being attached thereto at ends of the arms, the connector body having a flat underside and being a completely closed body and being completely hollow, the connector body having a closed, monocoque construction having external walls that carry the loads,
the cross-section of the arms of the connector body being box-shaped with an angular cross-section, the arms of the connector body extending horizontal and being made from flat plates, four flat sides including a top side, a bottom side, a left side, and a right side of each of the arms connect to each other via angular corners,
the tower, the connector body, and the suction buckets being rigidly mounted so that all loads including vertical and horizontal loads, bending moments, and torsion are transmitted from the tower to the three or more suction buckets via the connector body, the the tower is attached to the connector body with a beam of which a single longitudinal end is fixedly wedged so that the tower extends vertically upwards from the connector body as a cantilever beam, the tower being above the connector body with respect to the seabed, the tower being free from structures that transfer mechanical loads from the tower onto the seabed,
the foundation system extending a maximum of 15 meters above the local seabed and being disposed completely below the highest point of the connector body and only in the area downwards from the highest point of the connector body extend structures that are to the tower attached and transfer all loads, from the tower to the seabed.

* * * * *